No. 895,897. PATENTED AUG. 11, 1908.
C. D. SAXTON.
PUMPLESS STEAM SPRAYER.
APPLICATION FILED DEC. 18, 1907.
BEST AVAILABLE COPY
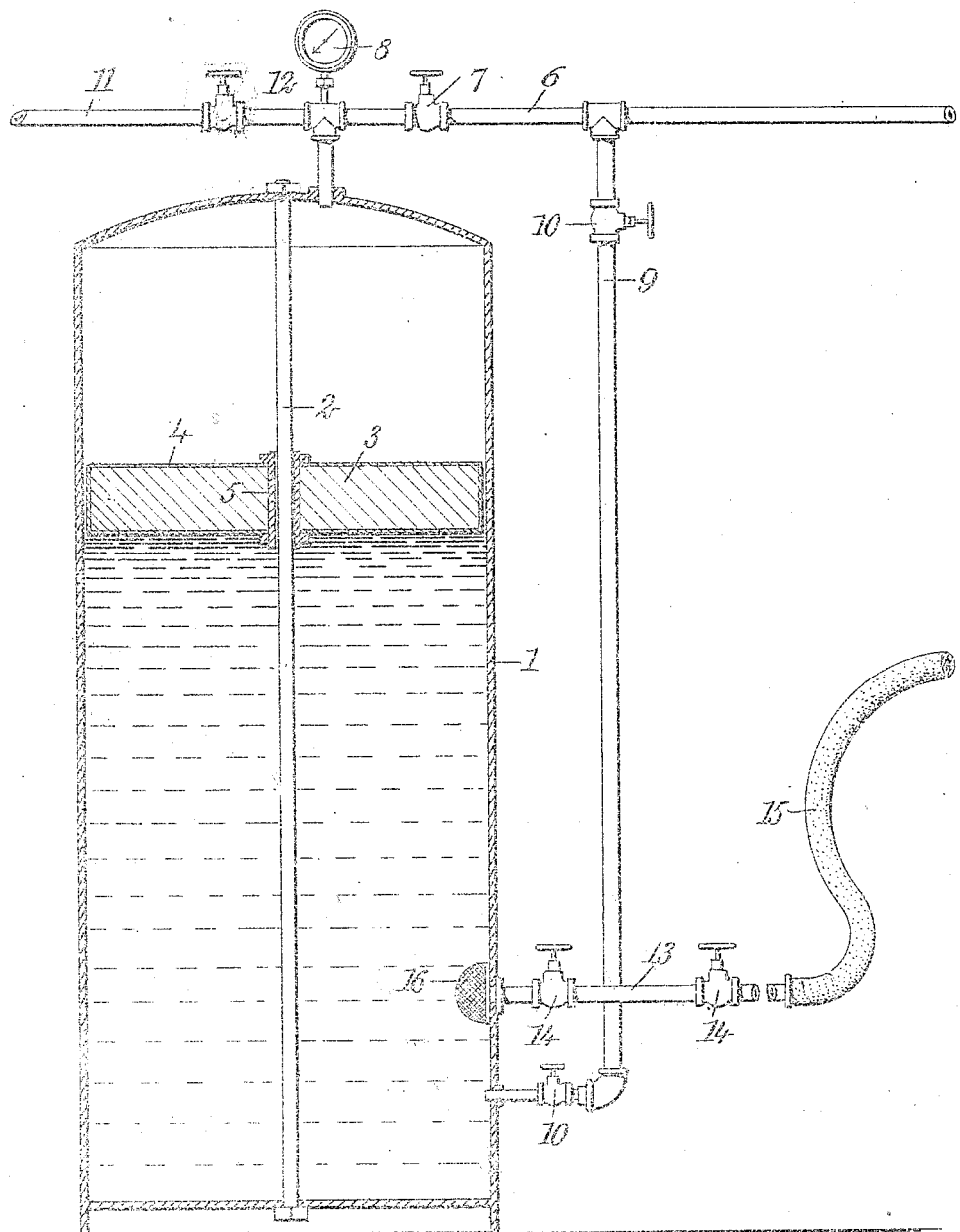
WITNESSES
INVENTOR
Charles D. Saxton
BY
ATTORNEYS

UNITED STATES PATENT OFFICE.

CHARLES D. SAXTON, OF BOISE, IDAHO.

PUMPLESS STEAM-SPRAYER.

No. 895,897.     Specification of Letters Patent.     Patented Aug. 11, 1908.

Application filed December 18, 1907. Serial No. 407,005.

*To all whom it may concern:*

Be it known that I, CHARLES D. SAXTON, a citizen of the United States, and a resident of Boise, in the county of Ada and State of Idaho, have invented a new and Improved Pumpless Steam-Sprayer, of which the following is a full, clear, and exact description.

The invention resides in certain new and useful improvements in the tank and connections therefor for applying a spraying solution, such solution for example, as is applied to trees and other vegetation for the killing of different kinds of infection.

Objects of the invention are to apply the solution from a tank under steam pressure in either a cold or hot state, to prevent the condensing of the steam in the tank when a cold solution is used, to fill the tank when empty by the suction caused by the condensation of the steam therein and to provide for the thorough mixing of the solution while in the tank, as well as the heating thereof if desired.

Reference is to be had to the accompanying drawing forming a part of this specification, wherein is represented in central vertical section the preferred embodiment of my invention, parts being in elevation.

In carrying out my invention I employ a tank 1 of suitable capacity, which is preferably in the nature of an upright, cylindrical body capable of withstanding considerable pressure. Within this tank is a central, vertical guide-rod 2 secured in any suitable manner at the ends of the tank and on which is guided a float 3, the latter consisting of a wooden core or body sheathed over with a sheet metal casing 4. A thimble 5 passing centrally through the float and secured by lock-nuts at its opposite ends forms a bearing on the rod 2 and prevents any angular movement of the float with respect to the tank when the liquid therein is splashed or agitated. The diameter of the float is such that a slight space is left between its circumference and the wall of the tank, whereby any liquid or solution introduced above the float may pass below it and the float may vertically move within the tank without undue friction.

A steam pipe 6 leading from a suitable source of supply has a valve 7 and connects with the top of the tank, and is also provided with a pressure-gage 8 and a branch pipe 9, the latter connecting it with the tank at a point near the bottom thereof. The branch pipe 9 has suitable controlling valves 10 placed respectively near the pipe 6 and near the point of discharge into the tank 1.

Leading into the pipe 6 near its point of discharge into the tank 1 is a liquid or solution supply pipe 11 having a controlling valve 12.

The tank 1 discharges when in operation, through a pipe 13 connected near its bottom. Controlling valves 14 regulate the supply through this pipe, which is connected up with one or more hose 15 each provided with the usual spraying nozzle. Any solid matter which may be in, or is used in the solution in the tank, is prevented from passing through the discharge pipe 13 by a strainer 16 arranged within the tank over the point of discharge.

In the operation of the tank and connections, when the tank is empty the solution which has been mixed in a barrel or other vessel is coupled up with the pipe 11 by a hose or in any other desired manner. Steam is then introduced into the tank by opening the valve 7 and the valves 14, or the steam may be introduced by opening the valves 10 in the branch pipe 9. If desired to heat the solution before it is introduced into the tank, the valve 12 in the liquid supply pipe should be opened. After all of the air has been driven out of the tank and pipe 11 all of the valves should be closed except the valve 12. Under these conditions, as the steam condenses in the tank a vacuum is created which causes the liquid to flow through the pipe 11 into the tank by the suction developed. When the tank is filled to the required point, the liquid supply is cut off. If the solution should be supplied from the tank in a hot state or if it should be heated while therein, as for example, to hasten chemical reaction between the chemicals which might be used in the solution, the valves 10 are opened, admitting the steam to the tank through the branch pipe 9. The escape of the steam through this pipe also agitates any solid matter which may collect in the bottom of the tank.

In supplying the spray pipes through the discharge pipe from the tank, the steam is introduced through the pipe 6 above the float. The metal sheathing on this float prevents the wooden core or body from swelling or cracking and the float shields the surface of the liquid from the steam, thus preventing the condensation of the steam by the contact with the solution should a cold solution be used. The tank and connections are of such form that the entire apparatus may be loaded on a wagon and transported to the place where it is to be used.

The construction as described and illustrated, while being my preferred embodiment of the invention, may, nevertheless, be variously modified within the scope of the claims annexed.

Having thus described my invention I claim as new and desire to secure by Letters Patent:

1. The combination of a tank adapted to hold a liquid, and steam supplies leading to the tank both above and below the level of the liquid.

2. The combination of a tank, a float movably mounted within the tank, and steam supplies leading to the tank both above and below the float.

3. The combination of a tank, a float movably mounted within the tank, steam supplies leading into the tank both above and below the float, means for regulating said supplies, and a discharge leading from the tank near the bottom thereof.

4. The combination of a tank having a float movably mounted therein, a steam supply and a liquid supply leading to the tank above the float, and a discharge leading from the tank below the float.

5. The combination of a tank having a float movably mounted therein, a steam supply and a liquid supply leading into the tank above the float, a pressure gage carried by said steam supply, a second steam supply leading into the tank below the float, and a discharge having a strainer leading from the tank below the float.

In testimony whereof I have signed my name to this specification in the presence of two subscribing witnesses.

CHARLES D. SAXTON.

Witnesses:
ALFRED ANDERSON,
WM. C. DUNBAR.